UNITED STATES PATENT OFFICE.

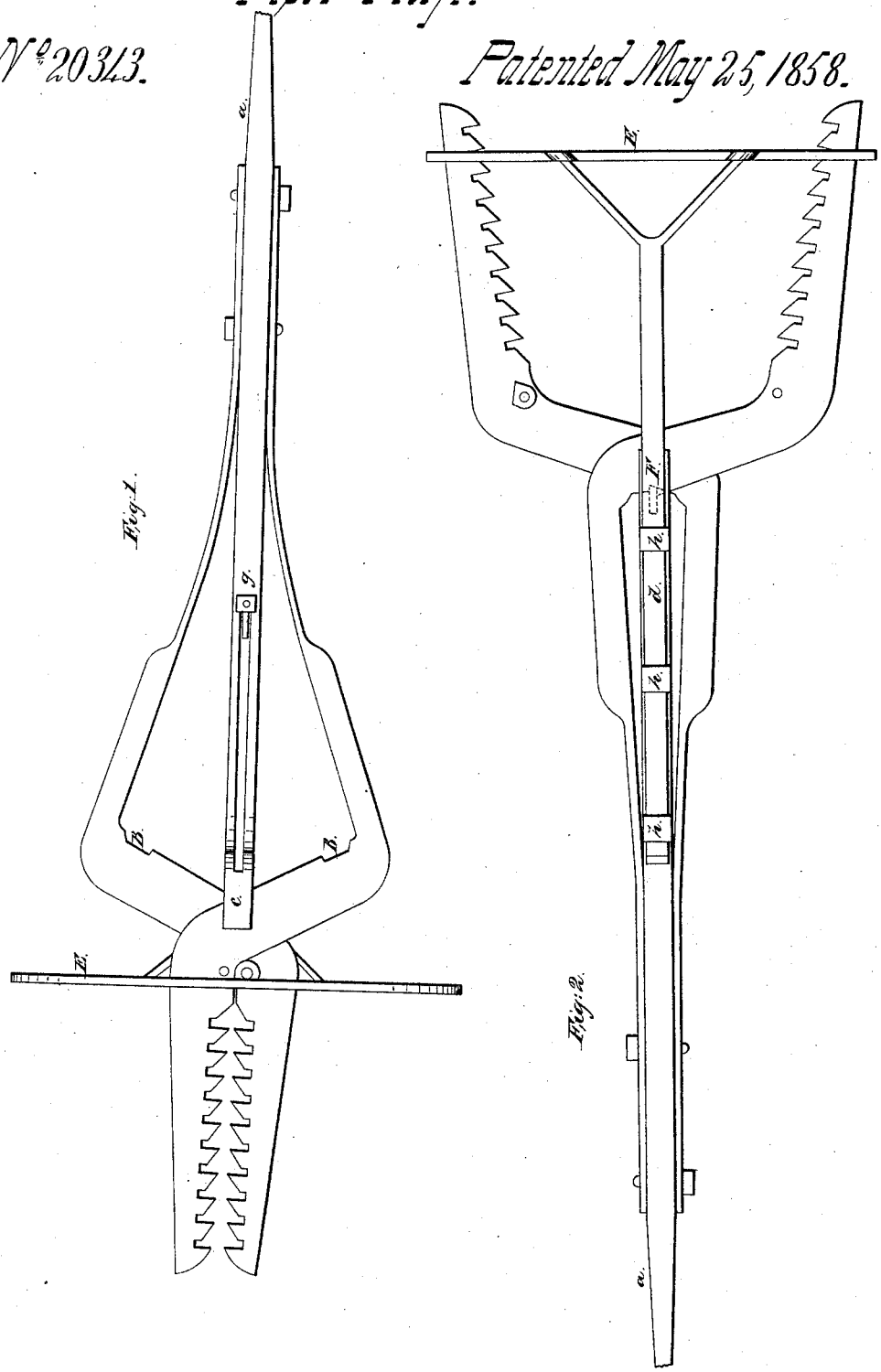

JACOB GARL, OF SUFFIELD TOWNSHIP, PORTAGE COUNTY, OHIO.

APPARATUS FOR CATCHING FISH.

Specification forming part of Letters Patent No. 20,343, dated May 25, 1858.

*To all whom it may concern:*

Be it known that I, JACOB GARL, of Suffield township, Portage county, Ohio, have invented a new and Improved Mode of Catching Fish; and I hereby declare that the following is a full and exact description thereof, reference being had to the accompanying drawings, and to the letters of reference marked thereon.

The nature of my invention consists of a toothed jaw which, upon the fish touching a sliding cross-bar, closes instantly upon the fish, which is held firmly between the toothed jaws.

To enable others skilled in the art to make and use my invention, I will proceed to describe its construction and operation.

In the drawings I have shown a view (No. 2) with the spring and trigger set and jaws open, and another view (No. 1) reversed with the jaws closed. The jaws are slightly curved and set opposite to each other, (see Figures 1 and 2,) and are set upon a pair of springs firmly fastened to the end which is intended to attach to the handle $a$, Figs. 1 and 2.

The springs, when set, are kept open by means of a notch cut in the holder at the heel of the jaw and end of the spring B, Fig. 1. The springs are attached to a rod, $a$, Figs. 1 and 2, which is intended to connect it with the handle, and the instrument is to be used in the manner that an ordinary fish-spear is used.

There is a forked bar which passes close to and over the heel of each jaw, which is intended to govern the jaws and keep them properly in place, $c$, Fig. 1. In the center of the main rod is a sliding bar, $d$, Fig. 2, to which is attached a sliding trigger, E, Figs. 2 and 1, consisting of a thin piece of iron or other metal carried around the jaws for the purpose of springing them when set, E, Fig. 2, which sliding trigger, when placed against or touched by the fish, slides up toward the handle, and the jaws closing upon the fish secure it.

Running along the main rod between the springs is a sliding bar, $d$, Fig. 2, to which the trigger is attached, which sliding bar is intended to travel up and down the main bar, and is held in its place by a key, F, Fig. 2, running through a slot and held in its place by a nut screwed on the end $g$, Fig. 1, and the bar is confined to its place by small bands of metal loosely embracing it, $h\ h\ h$, Fig. 1, I also place a nut riveted upon each jaw where they slide, to prevent the teeth from striking together.

What I claim as my invention, and desire to secure by Letters Patent, is—

The sliding trigger E, the notch B, key F, and nut $g$, as applied to a machine for catching fish, and described in my specification for that purpose.

JACOB GARL.

Witnesses:
JOHN S. HOLLINGSHEAD,
JOHNSON SIMONDS.